(12) United States Patent
Yang et al.

(10) Patent No.: US 9,760,823 B2
(45) Date of Patent: Sep. 12, 2017

(54) DISPLAYS WITH OPAQUE BORDERS

(71) Applicant: Apple Inc., Cupertino, CA (US)

(72) Inventors: Byung Duk Yang, Cupertino, CA (US); Kwang Soon Park, Cupertino, CA (US); Enkhamgalan Dorjgotov, San Francisco, CA (US); Kyung Wook Kim, Cupertino, CA (US); Shih Chang Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 307 days.

(21) Appl. No.: 14/711,217

(22) Filed: May 13, 2015

(65) Prior Publication Data
US 2015/0338699 A1    Nov. 26, 2015

Related U.S. Application Data

(60) Provisional application No. 62/002,720, filed on May 23, 2014.

(51) Int. Cl.
| | |
|---|---|
| *G02F 1/1335* | (2006.01) |
| *G06K 19/077* | (2006.01) |
| *G02F 1/1368* | (2006.01) |
| *G02F 1/133* | (2006.01) |
| *G06K 7/10* | (2006.01) |
| *G02F 1/1333* | (2006.01) |

(52) U.S. Cl.
CPC ....... *G06K 19/0772* (2013.01); *G02F 1/1368* (2013.01); *G02F 1/13306* (2013.01); *G02F 1/133512* (2013.01); *G02F 1/133528* (2013.01); *G06K 7/10198* (2013.01); *G02F 2001/133388* (2013.01)

(58) Field of Classification Search
CPC ............ G02F 1/1335; G02F 1/133512; G02F 1/133514; G02F 1/133528; G02F 1/1339; G02F 1/136209; G02F 1/134336; G02F 1/133509; G02F 1/1333; G02F 1/133345; G02F 1/136; G02F 1/1362; G02F 1/1368; G02F 2001/133388; H01L 27/1214; H01L 27/3272; G02B 5/30; G02B 5/3025
USPC ............................ 349/106, 110, 96, 153, 43
See application file for complete search history.

(56) References Cited

U.S. PATENT DOCUMENTS

| | | |
|---|---|---|
| 8,467,177 B2 | 6/2013 | Mathew et al. |
| 8,537,311 B2 | 9/2013 | Fletcher et al. |

(Continued)

*Primary Examiner* — Thoi Duong
(74) *Attorney, Agent, or Firm* — Treyz Law Group, P.C.; G. Victor Treyz

(57) ABSTRACT

A display may have an active area surrounded by an inactive border area. The display may be a liquid crystal display having a liquid crystal layer sandwiched between a color filter layer and a thin-film transistor layer. An upper polarizer may have a polarized central region that overlaps the active area of the display. The upper polarizer may also have an unpolarized portion in the inactive border area overlapping the border structures. The border structures may include colored material such as a white layer on the inner surface of the thin-film transistor layer. Binary information may be embedded into an array of programmable resonant circuits. The binary information may be a display identifier or other information associated with a display. The programmable resonant circuits may be tank circuits with adjustable capacitors, fuses, or other programmable components.

19 Claims, 15 Drawing Sheets

(56) References Cited

U.S. PATENT DOCUMENTS

| | | |
|---|---|---|
| 8,786,807 B2 | 7/2014 | Zhao et al. |
| 8,994,906 B2 | 3/2015 | Chang et al. |
| 2012/0106063 A1* | 5/2012 | Mathew ............ G02F 1/133528 361/679.21 |
| 2015/0131035 A1 | 5/2015 | Chen |

* cited by examiner

DISPLAYS WITH OPAQUE BORDERS

This application claims the benefit of provisional patent application No. 62/002,720, filed May 23, 2014, which is hereby incorporated by reference herein in its entirety.

BACKGROUND

This relates generally to electronic devices and, more particularly, to electronic devices with displays.

Electronic devices often include displays. For example, cellular telephones, computers, and televisions have displays.

The center of a display such as a liquid crystal display contains an array of pixels. This portion of the display, which is sometimes referred to as the active area of the display, is used to display images to a user. Peripheral circuits and other portions of the display that do not display images form a border that surrounds the inactive area. This border is sometimes referred to as the inactive area of the display.

To ensure that a display has an appealing appearance, it is generally desirable to hide internal components such as signal traces and other structures in the inactive area from view by the user. Accordingly, displays are often provided with plastic bezel structures that overlap the internal components in the inactive region. Bezel structures can be bulky and unsightly, so some displays are provided with a black ink border. The black ink border can be printed on the underside of a protective cover glass layer within the inactive area. The black ink border is thinner than a plastic bezel and helps hide internal display components in the inactive area of the display from view by the user.

Use of a display cover layer can introduce undesirable thickness and weight into a display. Some displays therefore dispense with the display cover layer and instead ensure that other display layers such as a color filter layer are sufficiently thick to provide the display with desired structural integrity. Black ink in this type of display may be incorporated under an upper polarizer layer in the inactive area of the display.

This type of arrangement poses challenges due to the presence of the polarizer. The polarizer reduces light transmission by half, resulting in reduced light reflection from the ink in the inactive area. If care is not taken, the border to have an unsightly appearance. For example, a white ink border would have an unsightly gray appearance rather than a desired white appearance.

As displays are manufactured and tested, it may be desirable to laser engrave an identifier within the border of the display. The identifier may be used to identify the display in the event that the display is later serviced. In some devices, there may be insufficient room available to engrave an identifier into the display or it may not be practical to form the identifier in an accessible location. These challenges may make it difficult to label a display with an identifier.

It would therefore be desirable to be able to provide electronic devices with improved display structures such as improved border masking structures and identifiers.

SUMMARY

An electronic device may be provided with a display. The display may have an active area and an inactive area. The active area may have a rectangular array of display pixels to produce images for viewing by a user. The inactive area may have the shape of a rectangular ring that surrounds the active area and that serves as a border for the display.

Border structures such as opaque border structures may be used to provide the border with a desired appearance. The border structures may include a layer of material such as a white inorganic layer, an inorganic layer with other colors, or other colored material to impart a desired color or other visible characteristics to the border when viewed from the exterior of the display.

The layer of material and other border structure materials may include pigment, ink, paint, metal, dye, polymer, inorganic materials, or other materials and may be provided in one or more layers. As an example, the border structures may include an anodized aluminum layer or other material that provides the border with a white appearance. The border structures may also include an optional additional layer such as a black layer or other opaque layer that overlaps the white layer (or the layer of other desired color). In the active area, portions of the black layer may be used in forming a black matrix with openings corresponding to the pixels. The opaque border structures may be sufficiently opaque to prevent a user from viewing internal display structures in the inactive area and may block stray light from an internal backlight unit.

The inactive area of the display may be provided with border structures that are formed on the underside of a display substrate layer. The border structures may include a first layer that is visible from the exterior of the display through the display substrate layer. The first layer may be a layer of white material (e.g., white inorganic material) or material of other colors (black, silver, gold, red, blue, green, etc.). The first layer may be formed on the underside of a glass substrate or other display layer. A second layer such as a black ink layer may cover the first layer and may help prevent light from passing through the opaque masking structures.

DETAILED DESCRIPTION

Illustrative electronic devices that have housings that accommodate displays are shown in FIGS. 1, 2, 3, and 4.

Figure 1:
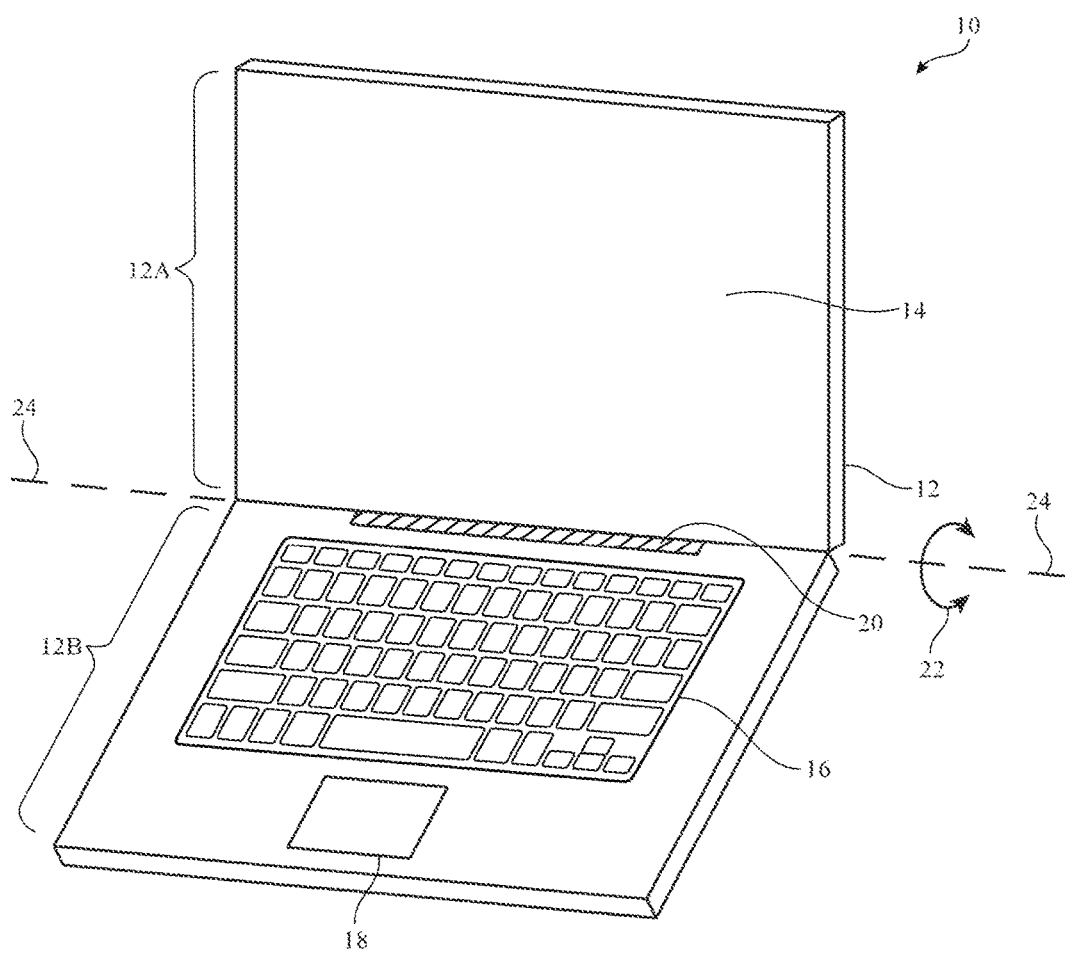
FIG. 1 is a perspective view of an illustrative electronic device such as a laptop computer with display structures in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
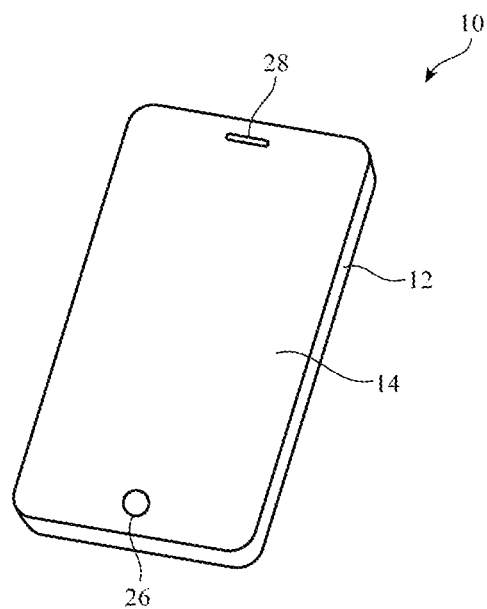
FIG. 2 is a perspective view of an illustrative electronic device such as a handheld electronic device with display structures in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28.

Figure 3:
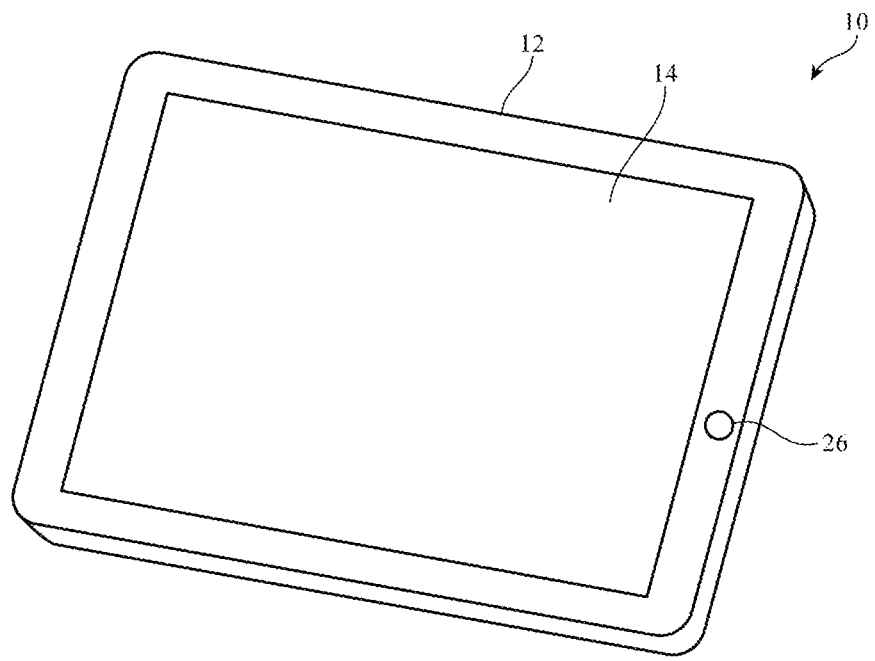
FIG. 3 is a perspective view of an illustrative electronic device such as a tablet computer with display structures in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an external layer with an opening to accommodate button 26.

Figure 4:
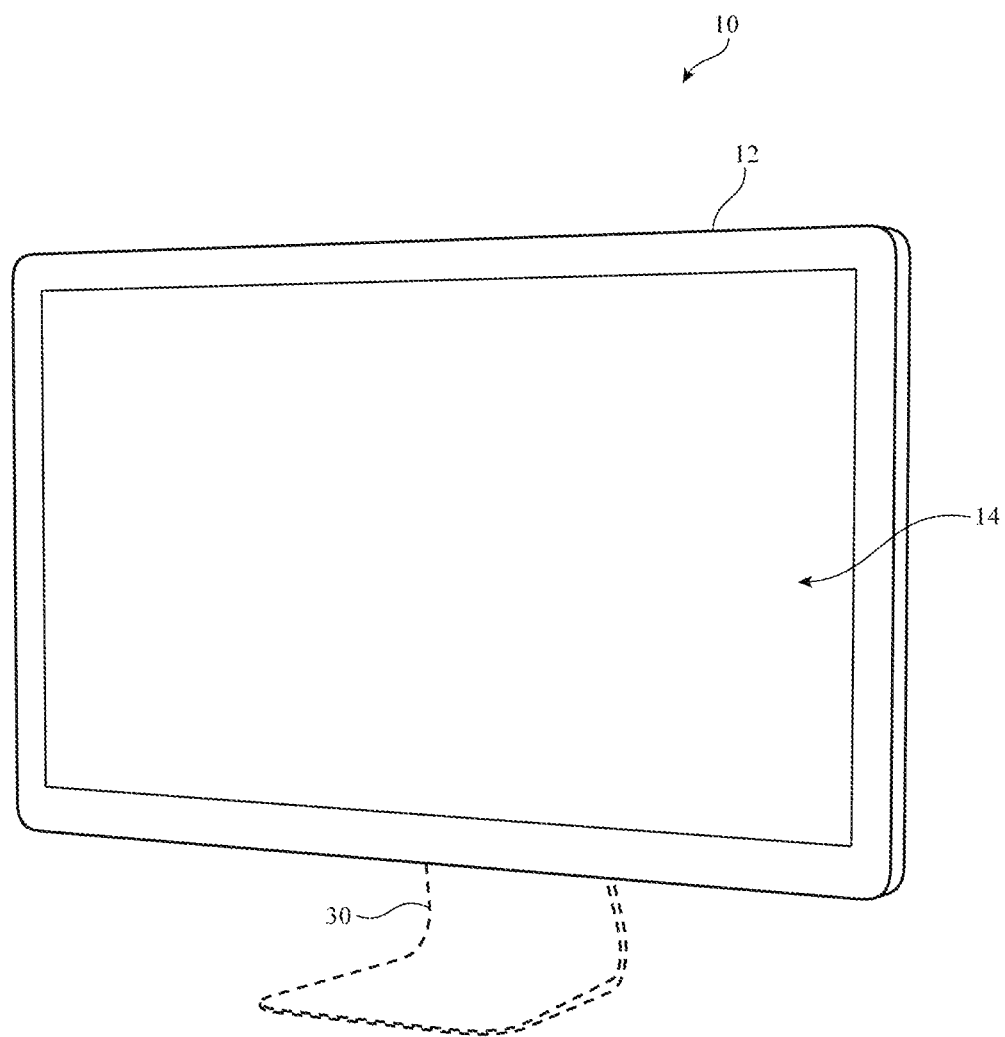
FIG. 4 is a perspective view of an illustrative electronic device such as a display for a computer or television with display structures in accordance with an embodiment.

FIG. 4 shows an illustrative configuration for electronic device 10 in which device 10 is a computer display or other display, a computer that has an integrated computer display, or other electronic equipment. Display 14 is mounted on a front face of housing 12. With this type of arrangement, housing 12 for device 10 may be mounted on a wall or may have an optional structure such as support stand 30 to support device 10 on a flat surface such as a table top or desk.

Display 14 may be a liquid crystal display or a display formed using other display technologies (e.g., a plasma display, an organic light-emitting diode display, an electrophoretic display, an electrowetting display, a hybrid display that incorporates multiple display types into a single display structure, etc.). Liquid crystal display structures for forming display 14 are sometimes described herein as an example.

Figure 5:
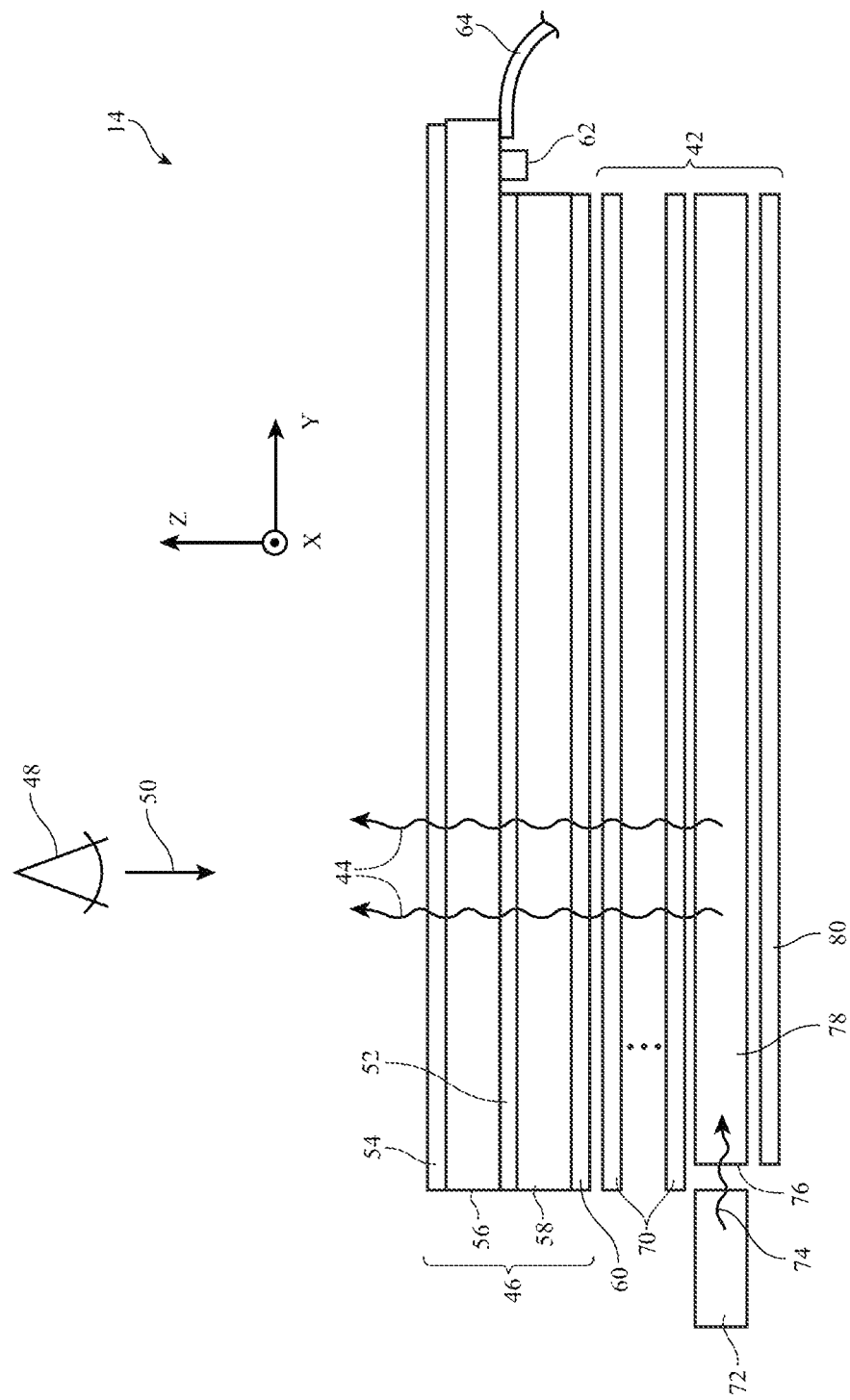
FIG. 5 is a cross-sectional side view of a liquid crystal display in accordance with an embodiment.

A cross-sectional side view of an illustrative configuration that may be used for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12).

Display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer by forming transistor circuits on a glass layer and to form a color filter layer by patterning color filter elements on a glass layer). Touch sensor electrodes may also be incorporated into layers such as layers 58 and 56 and/or touch sensor electrodes may be formed on other substrates.

With one illustrative configuration, layer 56 may be a thin-film transistor layer that includes an array of thin-film transistors and associated electrodes (display pixel electrodes) for applying electric fields to liquid crystal layer 52 and thereby displaying images on display 14. Layer 58 may be a color filter layer that includes an array of color filter elements for providing display 14 with the ability to display color images.

During operation of display 14 in device 10, control circuitry (e.g., one or more integrated circuits on a printed circuit board) may be used to generate information to be displayed on display 14 (e.g., display data). The information to be displayed may be conveyed to display driver integrated circuit 62 and/or thin-film transistor circuitry on one or more display layers 46 using a signal path such as a signal path formed from conductive metal traces in flexible printed circuit 64 (as an example).

Display driver integrated circuit 62 may be mounted on thin-film-transistor layer 56 or elsewhere in device 10. Signal lines in flexible printed circuit 64 may be used in routing signals between control circuitry in device 10 and thin-film-transistor layer 56. If desired, display driver integrated circuits such as circuit 62 may be mounted on a printed circuit. Printed circuits in device 10 may include rigid printed circuit boards (e.g., layers of fiberglass-filled epoxy) and flexible printed circuits (e.g., flexible sheets of polyimide or other flexible polymer layers).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other reflective materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint. If desired, optical films may be incorporated into other layers of display 14. For example, compensation films may be incorporated into polarizer 54 (as an example).

Figure 6:
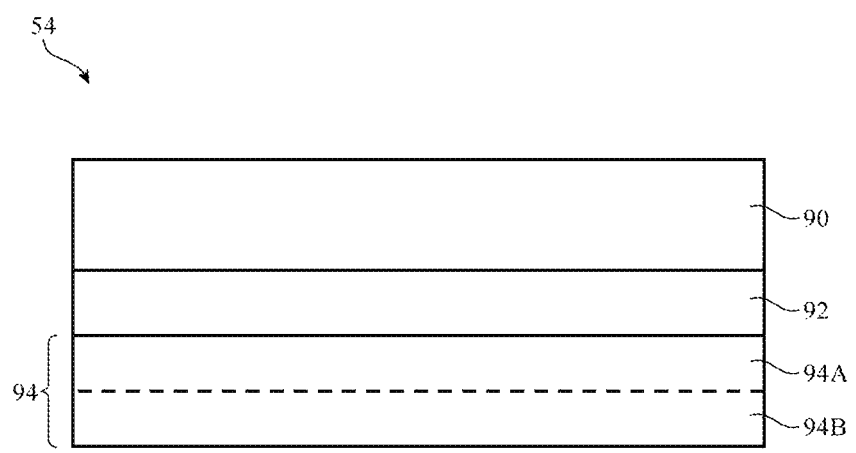
FIG. 6 is a cross-sectional side view of a polarizer in accordance with an embodiment.

Polarizers such as upper (outer) polarizer 54 and lower (inner) polarizer 60 may be formed from multiple layers of material that are laminated together. An illustrative laminated polarizer is shown in the cross-sectional side view of FIG. 6. As shown in FIG. 6, polarizer 54 (i.e., an upper polarizer in this example) may have polarizer film (layer) 92. Film 92 may be formed from a stretched polymer such as stretched polyvinyl alcohol (PVA) and may therefore sometimes be referred to as a PVA layer. A dichroic dye such as iodine or dichroic organic pigments may be added to the stretched PVA film to provide polarizer 54 with the ability to polarize light. Iodine may, for example, be coated onto the surface of layer 92 or may otherwise be used to dope layer 92. Molecules of iodine align with the stretched film of layer 92 and form the active polarizing layer of polarizer 54. Other polarizer films may be used if desired.

Polarizer film 92 may be sandwiched between layers 90 and 94. Layers 90 and 94 may be formed from clear polymers. For example, layer 90 may be formed from a material such as tri-acetyl cellulose (TAC) and may sometimes be referred to as a TAC film. The TAC film or other supporting substrate may help support and protect the PVA film. Other films may be laminated to film 92 if desired. For example, lower film(s) 94 may be formed from one or more compensation films 94A and 94B (i.e., birefringent films that help enhance off-axis viewing performance for display 14). Adhesive layers may be used to hold laminated films together. Functional layers such as antiscratch layers, anti-smudge layers, antireflection layers, and/or other layers may be coated on a polarizer (e.g., on the upper surface of layer 90), if desired.

The presence of polarizer material over the entire surface of display 14 may create challenges in forming desired border regions and in mounting components behind display 14. In the presence of polarizer material, light transmittance is cut in half. The presence of polarizer material around the edge of display 14 may affect the appearance of the border of display 14, because reduced light transmittance can affect the appearance of underlying border structures. As an example, when border material such as white ink is used to form the border for display 14, the presence of overlapping polarizer material may cause the white ink to have an undesirable gray appearance. Border structures of other colors may also be adversely affected.

Figure 7:
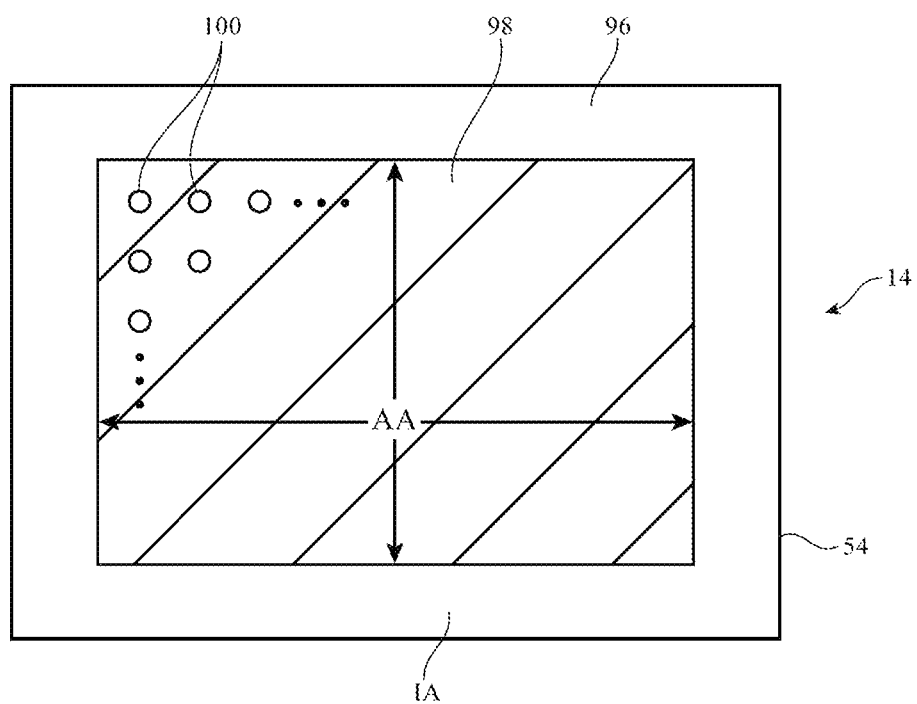
FIG. 7 is a top view of a display having a polarizer with a rectangular ring-shaped unpolarized region that runs along the rectangular periphery of the display and that serves as part of the border of the display in accordance with an embodiment.

To ensure that the border of display 14 has a desired appearance, polarizer 54 can be provided with a central rectangular polarized portion 98 surrounded by an unpolarized border such as border 96, as shown in FIG. 7. Unpolarized border 96 may overlap border structures in display 14 such as a layer of white border material or other border material. Other unpolarized areas may be provided within polarizer 54, if desired. The example of FIG. 7 in which polarizer 54 has been provided with a rectangular ring-shaped unpolarized region (unpolarized region 96) is merely illustrative.

Polarizer 54 can be chemically treated (e.g., with a strong base such as KOH) to change the chemical properties of the polarizer (i.e., to disrupt the iodine of the PVA layer) and thereby create the unpolarized region. If desired, laser bleaching may be used to form unpolarized regions in polarizer 54. A bleached polarizer region can be stabilized by adding a moisture barrier and/or stabilizing chemicals to the bleached region.

In a typical display configuration, display 14 may be provided with a rectangular array of display pixels that provide images for a user (see, e.g., display pixels 100 in FIG. 7). This rectangular portion of display 14 is sometimes referred to as the active area AA of display 14. An inactive border region, sometimes referred to as inactive area IA, may run along some or all of the peripheral edges of the active area AA. For example, display 14 may have an inactive area IA that has the shape of a rectangular ring and that forms a border running along all four sides of a central rectangular active area AA, as shown by inactive border area IA in FIG. 7.

To hide signal traces and other internal device structures from view by a user, inactive area IA may be provided with opaque border structures. The border structures may include a visible layer such as a layer of white material or a layer of material having other colors and may optionally include one or more additional layers (e.g., a layer of black material) to ensure that the border structures are sufficiently opaque to block internal components from view and/or to help prevent stray backlight from leaking out of display 14.

Particularly in scenarios in which the border of display 14 has a color that would be degraded by the presence of overlapping polarizer, it may be desirable to form unpolarized regions such as unpolarized border 96 in inactive area IA of FIG. 7 or to otherwise provide display 14 with a configuration that avoids placement of polarizer material on top of the border structures.

Figure 8:
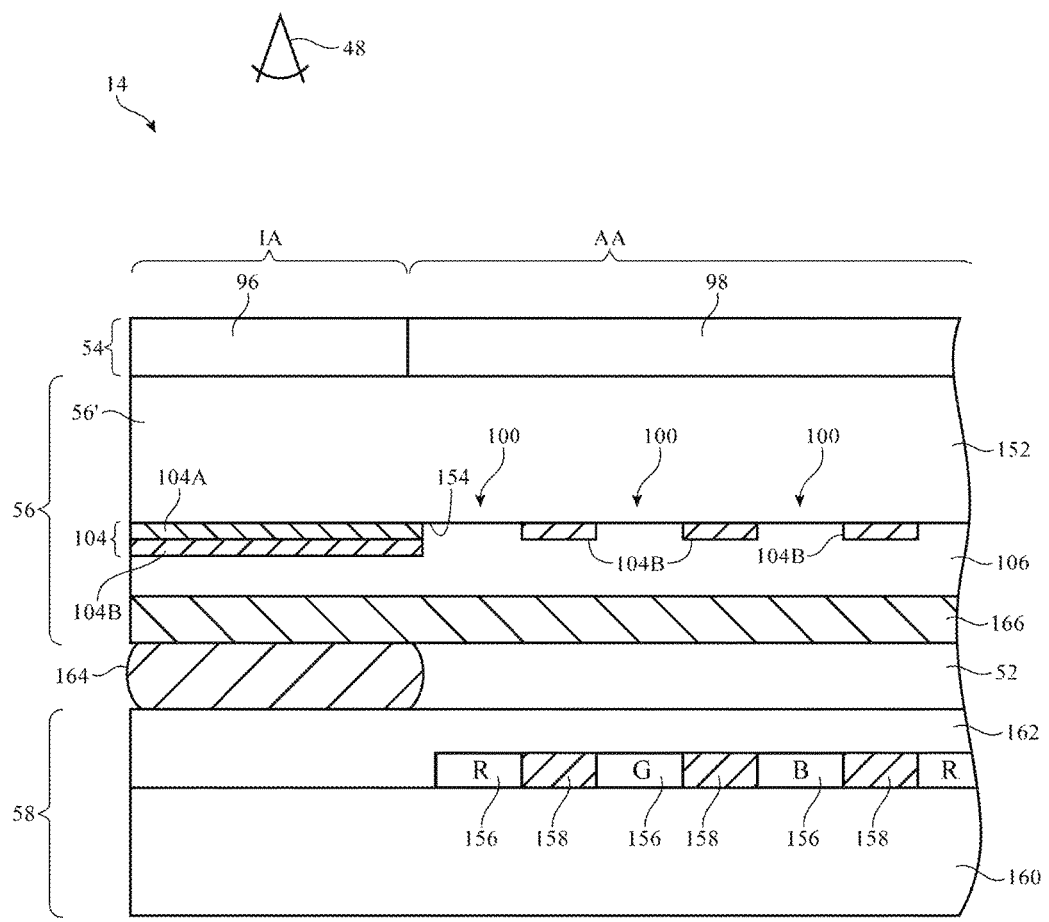
FIG. 8 is a cross-sectional side view of an illustrative display showing how border structures may be provided in an inactive region on the underside of a display layer such as a thin-film transistor layer and may be overlapped by an unpolarized border portion of a polarizer layer in accordance with an embodiment.

Consider, as an example, the configuration of FIG. 8. In this type of arrangement, polarizer 54 has been provided with a polarized region 98 that overlaps active area AA of display 14 and an unpolarized border region 96 that lies within the inactive area IA along the border of display 14 (e.g., a rectangular border of the type shown in FIG. 7). Thin-film transistor layer 56 has substrate layer 152 (e.g., a clear glass layer, a transparent plastic substrate, or other substrate material). Border structures 104 are formed on lower (inner) surface 154 of substrate 152. Polarizer 54 is attached to the opposing outer surface of substrate 152.

Border structures 104 include layer 104A and optional layer 104B. Layer 104A may be a layer of colored material having a color that is appropriate for viewing by user 48 through transparent border portion 56' of thin-film transistor layer 56 and unpolarized border 96. As an example, layer 104A may be a layer of white material or a material of other suitable colors (silver, gold, black, red, green, blue, etc.). Layer 104A may be an $Al_2O_3$ layer that is formed by depositing a layer of aluminum and anodizing the deposited aluminum layer, may be a ZnS layer, may be a $Ta_2O_5$ layer, may be other metal oxides, may be other inorganic layer(s), or may be formed using other materials. In some scenarios, layer 104A may be translucent or may otherwise be insufficiently opaque to block light. In these situations, one or more additional layers of material such as layer 104B may be deposited on the underside of layer 104A. Layer 104B may, for example, be a layer of black ink or other opaque masking material. The presence of layer 104B on layer 104A helps ensure that border structures 104 in inactive area IA are opaque. In configurations in which layer 104A is opaque, layer 104B may be omitted in inactive border area IA. In active area AA, layer 104B may form a black matrix having a series of openings associated with respective pixels 100. Each opening in the black matrix on thin-film transistor substrate layer 152 may be aligned with a respective color filter element 156 in color filter layer 58.

Thin-film transistor black masking material 102B may be formed from a photoimageable material such as black photoresist. The black photoresist may be formed from a polymer such as polyimide. To withstand the elevated temperatures involved in subsequent thin-film transistor fabrication steps, the polymer that is used in forming black masking material 102B preferably can withstand elevated temperatures (e.g., temperatures of 350° C. or higher or other suitable elevated temperatures). Opaque filler materials such as carbon black and/or titanium black may be incorporated into the polyimide or other polymer of layer 102B, so that layer 102B is opaque.

Thin-film transistor layer 56 includes thin-film transistor circuitry 166. Planarization layer 106 is used to planarize layer 102B so that thin-film transistor structures 166 can be formed on the lower side of thin-film transistor substrate layer 152. With one suitable arrangement, planarization layer 106 is formed from a black mask compatible material having a low dielectric constant such as a spin-on glass (SOG). For example, planarization layer 106 may be formed from a spin-on glass such as a silicon oxide based spin-on glass (e.g., a silicate spin-on glass) or other silicate layer.

During thin-film transistor formation, thin-film transistor structures and associated routing circuitry in layer 166 may be subjected to elevated processing temperatures (e.g., temperatures of 350° C. or higher). Layer 102A, layer 102B, and spin-on glass planarization layer 106 are preferably able to withstand processing at these elevated temperatures (i.e., spin-on glass layer 106 will not experience diminished transparency and layers 102A and 102B will not degrade).

Liquid crystal layer 52 may be interposed between thin-film transistor layer 56 and color filter layer 58. A peripheral ring of epoxy or other sealant 164 may be used to retain liquid crystal material 52 in the center of display 14.

Color filter layer 58 may have a clear glass or plastic layer such as color filter layer substrate 160. An array of color filter elements 156 (e.g., red, green, and blue color filter elements or color filter elements of other colors) may be formed for display pixels 100. Color filter elements 156 may be formed in openings in color filter layer black matrix 158. A clear polymer planarization layer such as overcoat layer 162 may be used to cover color filter elements 156 and black matrix 158 on color filter layer substrate 160, thereby planarizing color filter layer 58.

Figure 9:
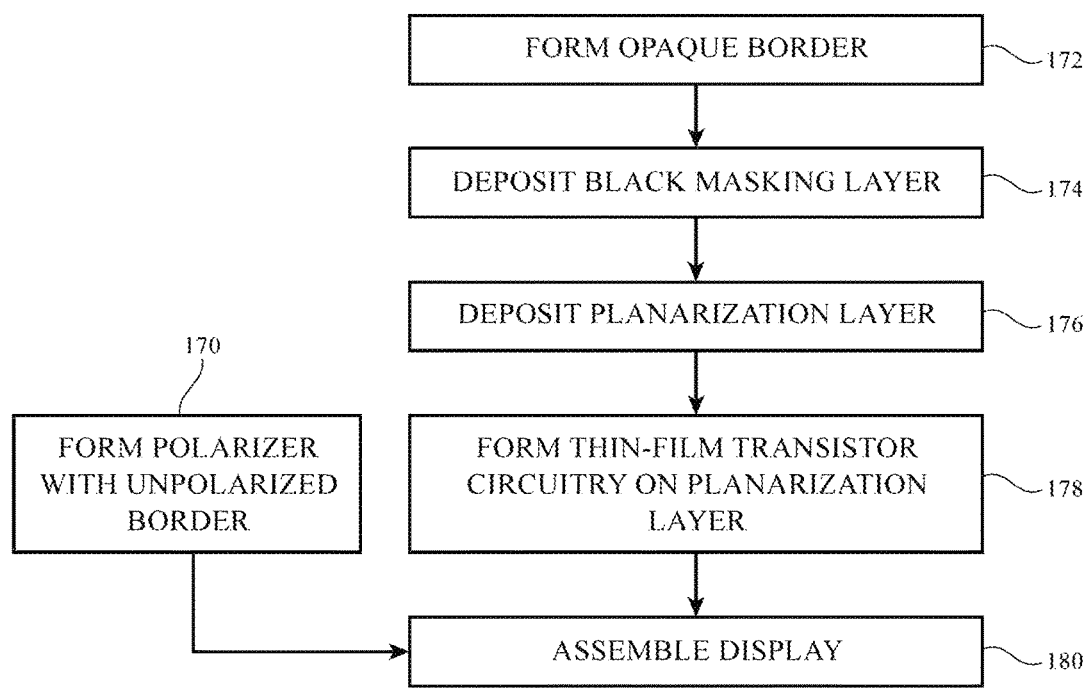
FIG. 9 is a flow chart of illustrative steps involved in forming a display of the type shown in FIG. 8 in accordance with an embodiment.

Illustrative steps involved in forming display 14 are shown in FIG. 9. At step 170, polarizer layer 54 may be formed. For example, chemical bleaching, laser bleaching, or other techniques may be used to form unpolarized border 96 in a rectangular ring shape around the periphery of a rectangular polarizer layer 54. Polarizer 60 (i.e., the lower polarizer for display 14) need not be provided with any unpolarized regions.

At step 172, opaque border structures 104 may be formed in inactive border area IA around the periphery of thin-film transistor substrate layer 152. For example, colored material 104A may be formed on lower surface 154 of substrate 152 in inactive area IA. Optional black layer 104A may be deposited in area IA and black matrix 104B in active area AA may be deposited during the operations of step 174. Deposition operations for layers 104A and/or 104B may be performed using screen printing, pad printing, ink jet printing, metal deposition followed by anodization, blanket deposition followed by etching, shadow mask deposition, physical vapor deposition, atomic layer deposition, chemical vapor deposition, electrochemical deposition, or other suitable deposition and patterning techniques.

After forming opaque border structures 104 during the operations of step 172 and 174, planarization layer 106 may be deposited at step 176.

During the operations of step 178, thin-film transistor circuitry 166 may be formed on planarization layer 106. Some of the thin-film transistor circuitry of layer 166 may lie within active area AA (e.g., thin-film transistors for controlling electric fields applied to liquid crystal layer 52 by pixel electrodes in pixels 100). Other thin-film transistor circuit structures in layer 166 may lie within inactive area IA (e.g., gate drivers and other display driver circuitry, etc.). If desired, some of the circuitry in inactive area IA of layer 166 may include radio-frequency identifier circuits for storing serial number information or other information.

At step 180, layers 56, 52, and 58 are assembled using sealant 164. Polarizer 54 is attached to the upper surface of thin-film transistor layer 56 and polarizer 60 is attached to the lower surface of color filter layer 58. Backlight unit 42 is incorporated into display 14 and display 14 is mounted within device 10. When attaching upper polarizer layer 54 to display 14, unpolarized border region 96 is aligned with border structures 104, so that border structures 104 are overlapped by unpolarized region 96. Border structures 104 and unpolarized border region 96 of polarizer 54 may have the shape of rectangular rings (e.g., rings made of four strips running along the four edges of display 14). The presence of layer 104A in the border can be used to adjust the color of inactive area IA as observed by an external viewer such as viewer 48. Layer 104A is visible through transparent unpolarized border region 96 in polarizer 54 and transparent border region 56' in thin-film transistor substrate layer 152.

Figure 10:
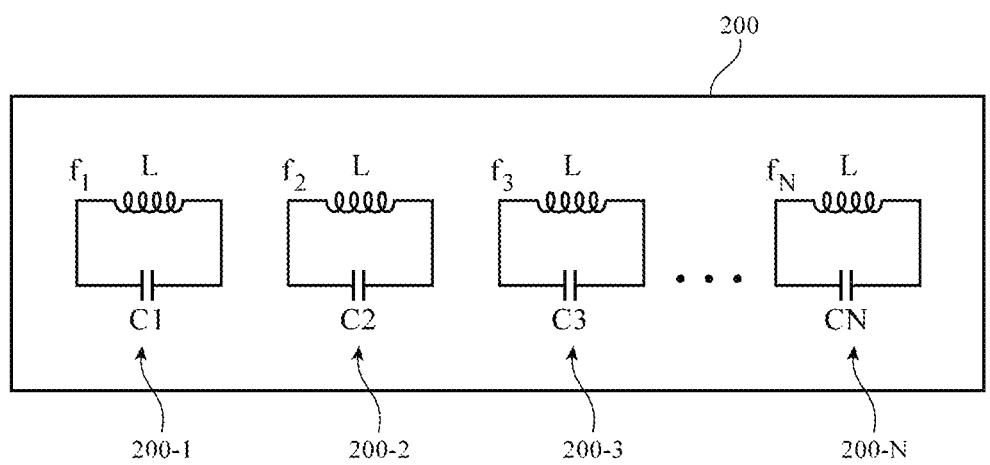
FIG. 10 is a diagram showing how a radio-frequency identifier may be formed from an array of programmable resonant circuits on a display in accordance with an embodiment.

FIG. 10 is a diagram of illustrative wireless identification circuitry (radio-frequency identification circuitry) that may be incorporated into thin-film transistor circuitry 166 in inactive area IA of display 14. Wireless identification circuitry 200 can be used to store display-specific information such as a display serial number, manufacturing date information or other manufacturing parameters, display type, test results (e.g., a defect list), process conditions used to manufacture parts of display 14, or other information associated with display 14. Wireless identification circuitry 200 can be programmed so that each individual display 14 (or set of displays 14) that is manufactured and tested is customized and contains appropriate embedded information for that display (or set of displays).

Wireless identification circuitry 200 can be programmed with embedded information such as display identification information or other information during manufacturing (e.g., using contact probes and programming equipment). At another stage of the manufacturing process, or later, following assembly of display 14 and device 10 and delivery to an end user, display 14 can be placed in proximity to a wireless reader. The wireless reader can apply radio-frequency signals to wireless identification circuitry 200 to read the information that was embedded (stored) within circuitry 200 during programming.

As shown in FIG. 10, circuitry 200 can include an array of resonant radio-frequency circuits 200-1, 200-2, 200-3, . . . 200-N. There may be any suitable number of resonant circuits in circuitry 200 (e.g., one or more, two or more, five or more, ten or more, or twenty or more (as examples). The resonant circuits may be LC circuits (sometimes referred to as tank circuits) or other circuits that resonate at radio frequencies (e.g., MHz or GHz). In configurations in which the resonant circuits are LC circuits, each resonant circuit has an inductor coupled in parallel with a capacitor. The values of the inductance and capacitance in each resonant circuit are preferably selected so that the resonant circuits resonate at discrete non-overlapping frequencies.

In the example of FIG. 10, each resonant circuit has the same inductance L, but has a unique respective capacitance C1, C2, C3, . . . CN. Configurations in which the inductance values of the resonant circuits vary may also be used, if desired.

The resonant circuits are programmable. Initially, when unprogrammed, resonant circuit 200-1 resonates at frequency f1 (e.g., 12 GHz), resonant circuit 200-2 resonates at frequency f2 (e.g., 15 GHz), resonant circuit 200-3 resonates at frequency f3 (e.g., 18 GHz), etc. During programming operations, the resonant frequencies of selected resonant circuits are altered, so that they no longer lie at their original unprogrammed frequency values. For example, the resonance of circuit 200-1 may be shifted from an unprogrammed value of 12 GHz to a programmed value of 40 GHz. Programming operations may involve adjusting the capacitance of a capacitor, adjusting the inductance of an inductor, blowing a fuse, or otherwise adjusting the resonant circuits of circuitry 200. During reading operations, the wireless behavior of circuitry 200 can be characterized and the pattern of programmed resonant circuits can be obtained. The presence or absence of programming for each of the resonant circuits in circuitry 200 can be used to digitally encode information such as a display identifier or other information into circuitry 200. Information may be encoded using binary encoding. An unprogrammed resonant circuit (i.e., a resonant circuit that has retained its initial unprogrammed resonant frequency) represents a binary "1" and a programmed resonant circuit (i.e., a resonant circuit that has been altered so that its resonant frequency lies out of band or is otherwise not as initially set) represents a binary "0".

With one suitable arrangement, capacitors in the resonant circuits of circuitry 200 may be formed from thin-film transistors. Programming of a resonant circuit may be accomplished by applying a programming bias to the thin-film transistor in that resonant circuit. The programming bias may stress the thin-film transistor and may shift the threshold voltage of the transistor (e.g., by populating traps in the semiconductor layer and other structures in the transistor). The shifted threshold voltage will, in turn, shift the capacitance-voltage characteristic of the transistor.

Figure 11:
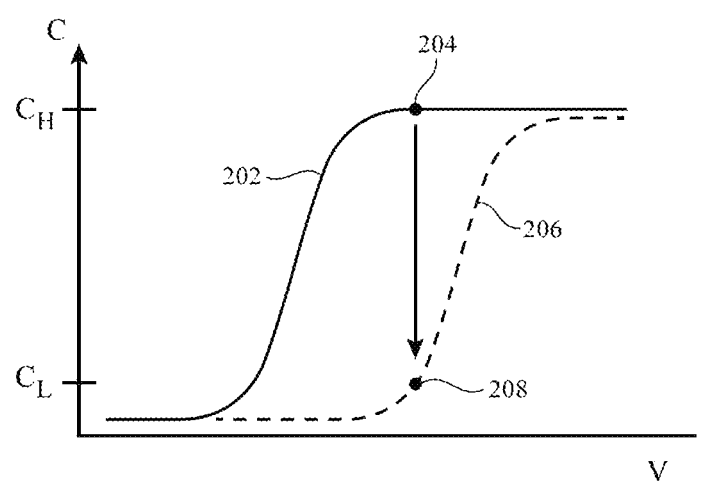
FIG. 11 is a graph showing how application of bias stress may shift the threshold voltage and associated capacitance characteristic of a thin-film transistor that is being used to form a thin-film transistor capacitor in accordance with an embodiment.

Consider, as an example, the scenario of FIG. 11. In the graph of FIG. 11, a transistor is initially characterized by C-V curve 202. Following application of bias stress, curve 202 shifts to curve 206. As a result, the capacitance of the thin-film transistor shifts (e.g., from high capacitance CH at point 204 to low capacitance CL at point 208). When the capacitance is lowered by programming, the resonant frequency of the resonant circuit in circuitry 200 (f~(LC)$^{-1/2}$) will increase beyond the normal range of frequencies f1 . . . fn that are associated with the resonant circuits of circuitry 200.

Figure 12:
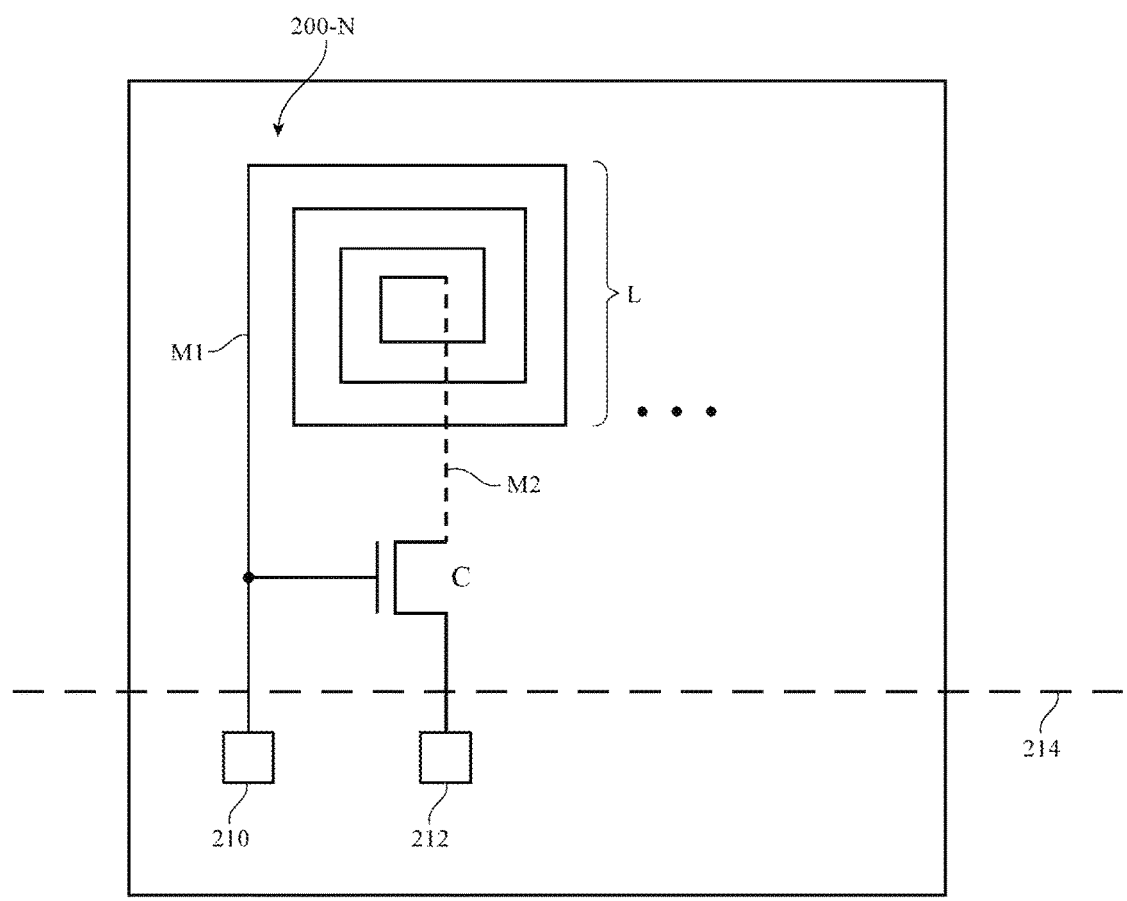
FIG. 12 is a diagram of an illustrative resonant circuit in accordance with an embodiment.

FIG. 12 is a top view of an illustrative resonant circuit. As shown in FIG. 12, resonant circuit 200-N has an inductor L and a capacitor C formed from a thin-film transistor. Programming electrodes 210 and 212 may be used to apply programming signals to circuit 200-N. In the absence of programming, capacitor C may have a capacitance of CH. Following programming (e.g., by applying a voltage of 20 volts to electrode 210 and a voltage of 0 volts to electrode 212 or using other suitable programming signals), capacitor C will have a capacitance of CL. As a result, the resonant frequency of circuit 200-N will shift from fn to fn', where fn'>>fn.

Once a desired subset of resonant circuits in circuitry 200 have been patterned to embed desired binary data in circuitry 200, programming electrodes 210 and 212 may, if desired be removed (e.g., by scribing and breaking the display layer on which circuitry 200 is formed (e.g., thin-film transistor layer 56) along scribe line 214. Because circuitry 200 need not be visible to wirelessly read information from circuitry 200, circuitry 200 may be formed in small and inaccessible locations within display 14 such as the portion of layer 166 in inactive area IA (as an example).

Figure 13:
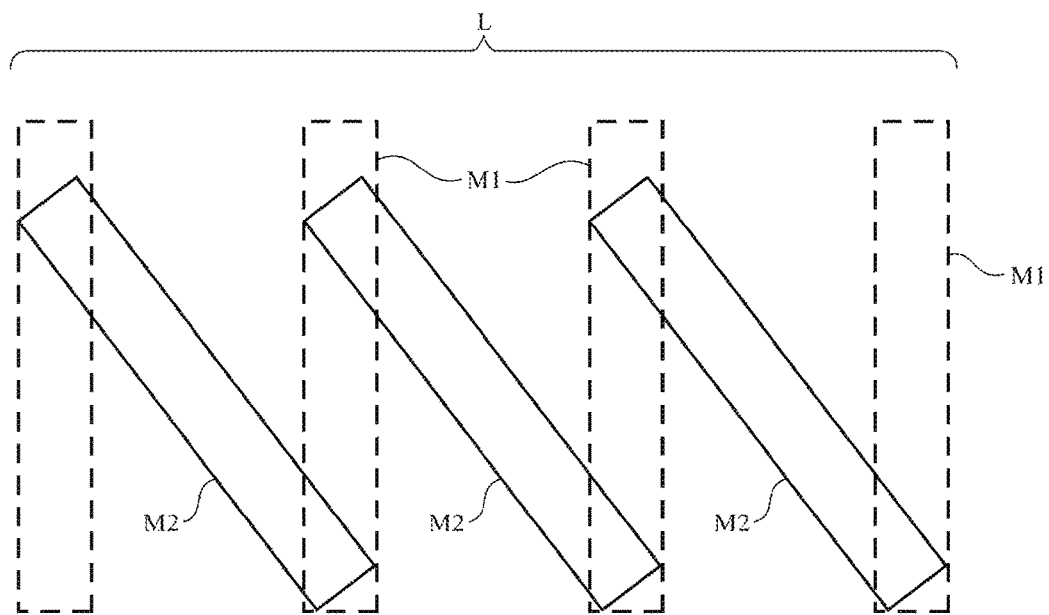
FIG. 13 is a top view of an illustrative corkscrew inductor in accordance with an embodiment.
Figure 14:
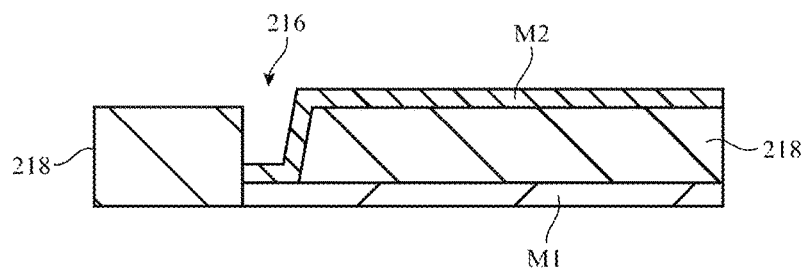
FIG. 14 is a side view of the illustrative inductor of FIG. 13 in accordance with an embodiment.

In the example of FIG. 12, inductor L is a spiral inductor formed from two metal layers: lower metal layer M1 and upper metal layer M2. FIGS. 13 and 14 show how inductor L may be formed using a corkscrew inductor layout. FIG. 13 is a top view of an illustrative corkscrew inductor. As shown in FIG. 13, a corkscrew-shaped conductive line for inductor L may be formed by connecting a series of parallel M1 metal lines to respective diagonal M2 metal lines. FIG. 14 shows how M1 and M2 metal lines may be joined to form a continuous corkscrew conductor using vias such as via 216 in dielectric layer 218.

Figure 15:
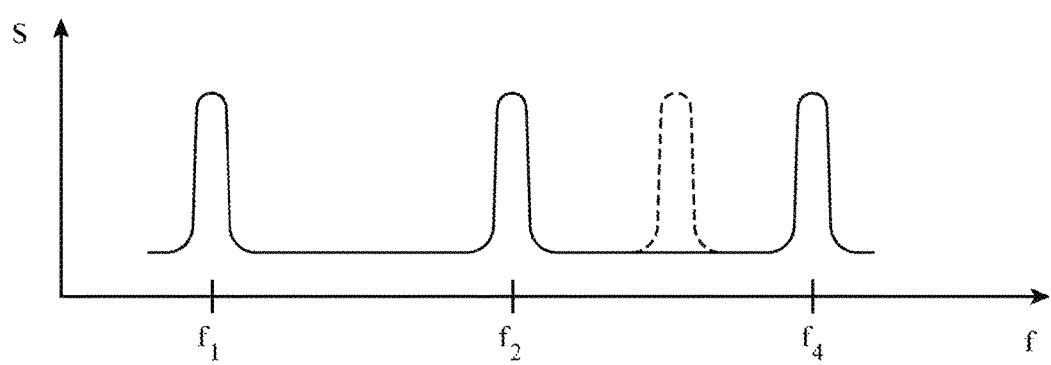
FIG. 15 is a graph in which the response of an array of resonant circuits has been plotted as a function of frequency in accordance with an embodiment.

FIG. 15 is a graph in which the readout from a wireless reader (signal S) has been plotted as a function of frequency f. The wireless reader may have a near-field communications antenna (e.g., an inductor) that is coupled to inductor L in each resonant circuit in circuitry 200 by inductive coupling (i.e., near-field electromagnetic coupling). Signal S may be the real part of the impedance of circuitry 200 as measured by the reader or may be another signal that is sensitive to the presence and absence of circuit resonances in circuitry 200. The wireless reader may scan across all frequencies f of interest (i.e., frequencies from low frequency f1 to high frequency fn). In a typical scenario, the resonances at some of the unprogrammed resonant frequencies for circuitry 200 will be present because the resonant circuits associated with those frequencies will not have been programmed and the resonances at other unprogrammed resonant frequencies for circuitry 200 will no longer be present because the resonant circuits associated with those frequencies will have been programmed by the programming tool (e.g., by applying a bias to resonant circuit programming electrodes such as electrodes 210 and 212 of FIG. 12).

In the example of FIG. 14, there are four resonant circuits in circuitry 200 associated with four respective unprogrammed resonant frequencies f1, f2, f3, and f4. During programming, the resonant circuit for frequency f3 was programmed (i.e., capacitor C3 was stressed to reduce its capacitance value). As a result, the resonant frequencies for the first, second, and fourth resonant circuits are unchanged (f1, f2, and f4), whereas the resonant frequency for the third resonant circuit is changed sufficiently to no longer be present within the frequency range covered by the reader (i.e., frequency f3 has been shifted out of band to a significantly higher frequency due to the programming of capacitor C3). The wireless reader can detect the binary pattern associated with unprogrammed and programmed resonant circuits (i.e., 1111 before programming and 1101 following programming in the example of FIG. 15). Using this binary information, the reader can extract information about display 14 or other components in device 10 (e.g., display identification number information, test results for the display, manufacturing parameters for the display, etc.).

Figure 16:
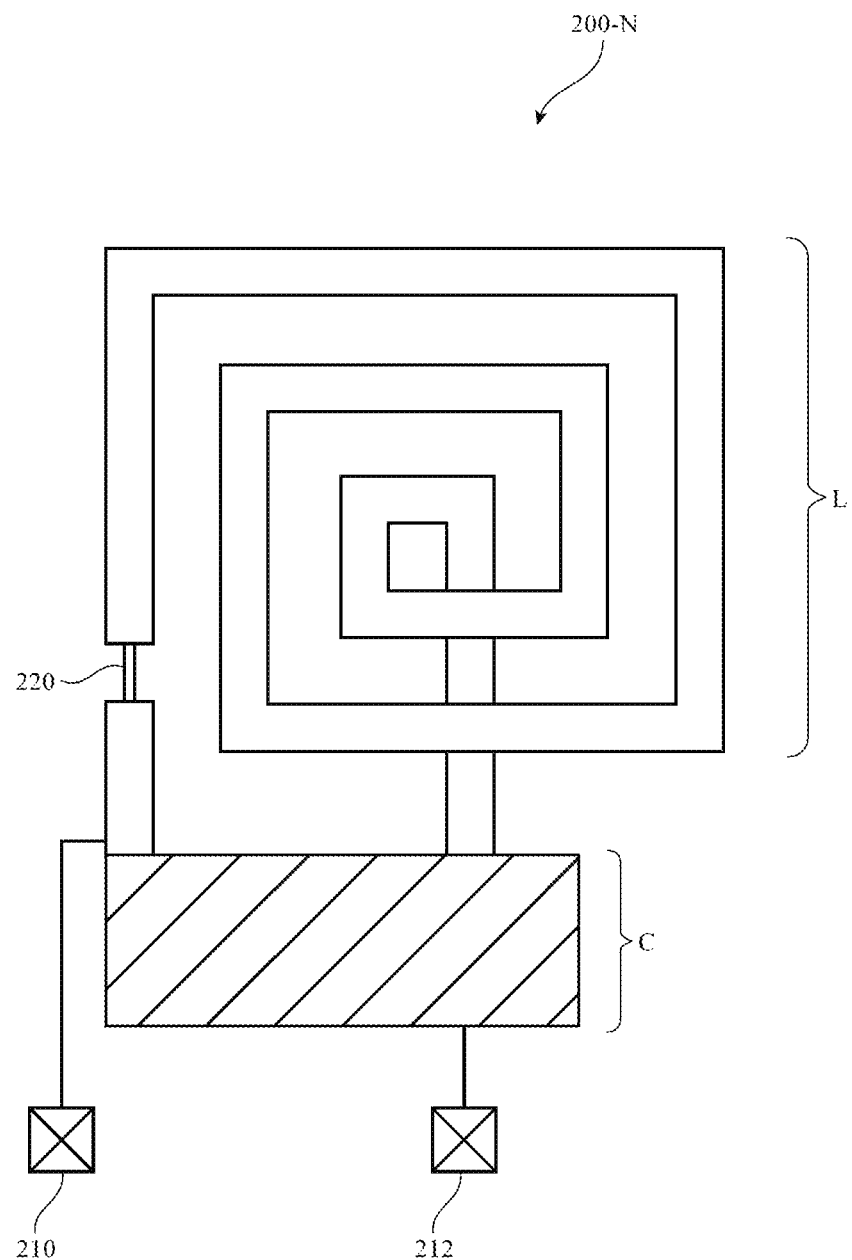
FIG. 16 is a top view of an illustrative programmable resonant circuit prior to programming of the circuit to blow a fuse in accordance with an embodiment.

FIG. 16 is a top view of an illustrative resonant circuit having an inductor that can be programmed by applying a programming current to fuse portion 220 of inductor L. Capacitor C in the FIG. 16 example may be formed from parallel rectangular plates separated by a dielectric such as silicon oxide. Inductor L may be formed from a spiral of metal in a first metal layer M1 and metal in a second metal layer M2, may be formed from a corkscrew inductor structure, or may be formed from other inductor structures. If desired, resonant circuits such as circuit 200-N of FIG. 12 may be programmed by applying a voltage to capacitor C in excess of the dielectric breakdown voltage for the oxide layer.

Figure 17:
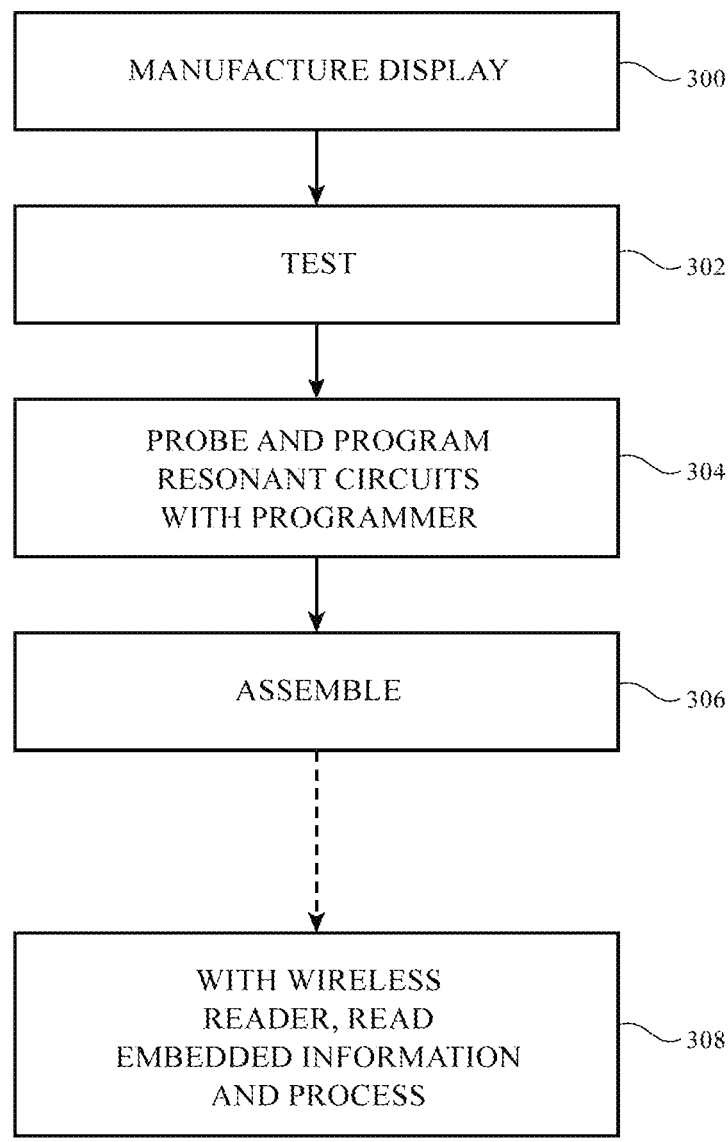
FIG. 17 is a flow chart of illustrative steps involved in using an array of programmed resonant circuits to provide a component such as a display with a wireless identifier in accordance with an embodiment.

A flow chart of illustrative steps involved in using resonant circuits to embed binary information in a display or other portion of device 10 are shown in FIG. 17.

At step 300, display 14 may be manufactured. Manufacturing parameters may be associated with the manufacturing process such as the identity of subcomponents, the temperatures, times, and other process variables associated with process steps, etc.

At one or more testing operations (step 302), tests may be performed on one or more portions of display 14 to characterize display 14 and/or the components of display 14.

During the operations of step 304, circuitry 200 may be programmed using a programmer. The programmer may have probes that contact electrodes such as electrodes 210 and 212 for each resonant circuit within circuitry 200. The programmer may apply programming signals (currents and voltages) that blow fuses, that change the threshold voltage and therefore the capacitance of thin-film transistor capacitors, that alter the capacitance exhibited by parallel plate capacitors, or that otherwise adjust the circuitry of one or more resonant circuits in circuitry 200. The pattern of programmed resonant circuits in circuitry 200 can be used to embed binary information into circuitry 200. The information that is embedded within circuitry 200 may include manufacturing parameters from step 300, test results from step 302, display numbers, dates, times, display types, fault information, etc. If desired, scribe and break techniques or other techniques may be used to remove the programming electrodes from circuitry 200 or may otherwise be used to process circuitry 200 in a way that makes the programming electrodes inaccessible to subsequent direct programming.

Display 14 and, if desired, device 10, may be assembled following programming of circuitry 200 (step 306).

After display 14 and device 10 have been assembled, display 14 and device 10 may be used by a user in the field. In the event of a need for servicing, display 14 and device 10 can be taken to a service center. At the service center, a wireless reader may be used to read out the binary information that was embedded in circuitry 200. The wireless reader may include circuitry (e.g., one or more inductors and associated radio-frequency circuitry) for inductively coupling to the resonant circuits of circuitry 200. The wireless reader sweeps across all frequencies of interest (i.e., from lowest unprogrammed frequency f1 to highest unprogrammed frequency fn). Expected resonances that are present correspond to binary "1" values and missing resonances correspond to binary "0" values (or vice versa). The binary information gathered by the reader this way may be used by personnel at the service center (e.g., to log a display into a database, to retrieve display-specific repair instructions, to access other database information associated with the embedded information in circuitry 200, etc.).

The foregoing is merely illustrative and various modifications can be made by those skilled in the art without departing from the scope and spirit of the described embodiments. The foregoing embodiments may be implemented individually or in any combination.

What is claimed is:

1. A display having an active area surrounded at least partly by an inactive border area, comprising:
    a thin-film transistor layer having a thin-film transistor substrate layer and a layer of thin-film transistor circuitry;
    a color filter layer;
    a layer of liquid crystal material interposed between the thin-film transistor layer and the color filter layer;
    an upper polarizer having a polarized region overlapping the active area and having an unpolarized region in the inactive border area;
    a lower polarizer, wherein the thin-film transistor layer, the layer of liquid crystal material, and the color filter layer are interposed between the upper polarizer and the lower polarizer; and
    opaque border structures on a surface of the thin-film transistor substrate layer in the inactive border area, wherein the opaque border structures are interposed between the thin-film transistor substrate layer and the layer of thin-film transistor circuitry.

2. The display defined in claim 1 wherein the opaque border structures include a white layer.

3. The display defined in claim 2 wherein the opaque border structures include a black layer having a portion that overlaps the white layer.

4. The display defined in claim 3 wherein the black layer includes a black matrix portion in the active area.

5. The display defined in claim 1 wherein the opaque border structures comprise an inorganic layer.

6. The display defined in claim 5 wherein the inorganic layer comprises a layer selected from the group consisting of: a while layer, a silver layer, a gold layer, a black layer, a red layer, a green layer, and a blue layer.

7. The display defined in claim 5 wherein the inorganic layer comprises a white material selected from the group consisting of: $Al_2O_3$, $ZnS$, and $Ta_2O_5$.

8. The display defined in claim 5 wherein the inorganic layer is a metal oxide.

9. The display defined in claim 2 further comprising a planarization layer that is interposed between the opaque border structures and the layer of thin-film transistor circuitry.

10. The display defined in claim 9 wherein the planarization layer comprises a silicate layer.

11. The display defined in claim 1 wherein the unpolarized region has a rectangular ring shape that runs along peripheral edges of the display.

12. A display having a rectangular active area surrounded by an inactive border area, comprising:
a thin-film transistor layer having a glass substrate with an outer surface and an opposing inner surface and having a peripheral white border layer on the inner surface in the inactive border area; and
a polarizer on the outer surface that has an unpolarized border portion in the inactive border area overlapping the peripheral white border layer.

13. The display defined in claim 12 further comprising:
a color filter layer; and
a layer of liquid crystal material between the color filter layer and the thin-film transistor layer.

14. The display defined in claim 12 wherein the thin-film transistor layer comprises a planarization layer and wherein the white border layer is interposed between the glass substrate and the planarization layer.

15. The display defined in claim 14 wherein the thin-film transistor layer comprises thin-film transistor circuitry and wherein the planarization layer is interposed between the glass substrate and the thin-film transistor circuitry.

16. A display having an active area and an inactive border area that runs along at least one edge of the active area, comprising:
a first substrate layer;
a second substrate layer;
a layer of liquid crystal material interposed between the first and second substrate layers;
an upper polarizer having a polarized region overlapping the active area and having an unpolarized region in the inactive border area;
a lower polarizer, wherein the first substrate layer, the layer of liquid crystal material, and the second substrate layer are interposed between the upper polarizer and the lower polarizer; and
opaque border structures on a surface of the first substrate layer in the inactive border area, wherein the opaque border structures are interposed between the first substrate layer and a layer of thin-film transistor circuitry.

17. The display defined in claim 16 wherein the opaque border structures include a white layer.

18. The display defined in claim 17 wherein the opaque border structures include a black layer having a portion that overlaps the white layer.

19. The display defined in claim 16 wherein the opaque border structures comprise an inorganic layer selected from the group consisting of: a white layer, a silver layer, a gold layer, a black layer, a red layer, a green layer, and a blue layer.

* * * * *